United States Patent [19]

Koizumi et al.

[11] Patent Number: 4,881,722
[45] Date of Patent: Nov. 21, 1989

[54] APPARATUS FOR PRODUCING SUPERFINE PARTICLE

[75] Inventors: Tadashi Koizumi, Tokyo; Seiji Yokota, Kanagawa; Shigeo Matsumura; Yoshiaki Inoue, both of Tokyo, all of Japan

[73] Assignee: Neturen Company Limited, Tokyo, Japan

[21] Appl. No.: 336,560

[22] Filed: Apr. 11, 1989

Related U.S. Application Data

[63] Continuation of Ser. No. 143,644, Jan. 13, 1988, abandoned.

[30] Foreign Application Priority Data

Jan. 27, 1987 [JP] Japan ................ 62-9300[U]

[51] Int. Cl.$^4$ .............................. B22F 9/14
[52] U.S. Cl. .................. 266/176; 75/0.5 C; 219/273
[58] Field of Search .......... 266/192, 176, 200; 373/18, 24; 75/0.5 C; 219/273

[56] References Cited

U.S. PATENT DOCUMENTS

| 706,475 | 8/1902 | Pohl | 75/0.5 C |
| 2,885,201 | 5/1959 | Evenstad | 266/192 |
| 4,423,303 | 12/1983 | Hirose et al. | 373/18 |
| 4,734,551 | 3/1988 | Cheek | 373/18 |

Primary Examiner—S. Kastler
Attorney, Agent, or Firm—Wenderoth, Lind & Ponack

[57] ABSTRACT

In preparing superfine particle in a reaction chamber by evaporation-in-gas method or on such processes as PVD or CVD using arc- or high-frequency plasma wherein in the proximity of the inner surface of the said reaction chamber, a vessel provided with a number of pores thereon is arranged and gas consisting of given components is introduced into the space between the inner surface of the chamber and the vessel, and spouted through the said pores on the vessel. The resultant superfine particle produced in the chamber and being in Brownian movement or in thermal migration does not adhere to the surface of the vessel by being separated from the vessel by the spouting gas so that the gas containing superfine particle is directed securely to the collecting path, wherein the vessel is made of the material not reactive with the resultant superfines but resistant to heat.

5 Claims, 2 Drawing Sheets

APPARATUS FOR PRODUCING SUPERFINE PARTICLE

This application is a continuation of application Ser. No. 143,644, filed Jan. 13, 1988, now abandoned.

FIELD OF INVENTION

This invention relates to an apparatus and more particularly to the construction of a reaction chamber and a piping system in which superfine particles of inorganic substances such as metals or ceramics and the like from the raw materials in solid, liquid or gas in a reaction chamber are produced by means of the evaporation-in-gas method, of PVD (Physical Vapor Deposition) or of CVD (Chemical Vapor Deposition) by using such methods as arc- or high-frequency plasma, laser or electron beams and said particles are caused to disperse and float in a gas for collection.

DESCRIPTION OF PRIOR ART

Because of its uniqueness in magnetic, optical, thermal and chemically reactive properties, neither obtainable in bulk nor in powder, superfine particles have lately become the object of intensive research and development as a new materials in a variety of technical fields. For the production of superfine particles, development efforts have mainly been directed to improvements in purity, productivity, collection and so on.

The purity and uniform size are important requirements for the quality of superfine particles so that they are produced by chemical reaction in a chamber isolated severely from outside except for wet processes.

The superfine particles produced thereby are dispersed and floated in gas so that the reaction chamber is filled with a smog containing superfine particles, thus necessitating recovery of superfines from the said smog.

The method of collection of superfines from the smog are divided into two groups;

The one is to utilize temperature inclination in the chamber in which the superfines-producing region is at such high temperature as several thousands centigrade and the temperature declines as the distance from it becomes greater.

The other is to make use of the flow of smog. In various conventional superfines-producing apparatuses, however, the collection methods are not free from the problems from the standpoint of purity, productivity, and collection. The said problems are described below with reference to FIGS. 2(a)~(d) attached hereto, illustrating some typical conventional apparatuses.

FIG. 2(a) is an apparatus for the evaporation-in-gas method in which the raw material in the crucible CR placed in the reaction chamber 1' into which inert gas G' is introduced, is heated, melted and evaporated by means of heating coil and is conducted along with the inert gas G' into an exhaust pipe P' with a heater externally mounted thereto, resultant superfine particles being caught by a filter f' provided at the outer end of the said exhaust pipe and located outside the reaction chamber for being kept at low temperature.

This method of recovery belongs to the latter group.

In the said apparatus, a portion of vapor produced touches the surface of the inner wall of the reaction chamber 1' before being introduced into the pipe P' and superfine particles tend to adhere to the said wall, with the apparatus itself being not designed for continuous operation.

Such apparatus in the continued operation results in accumulation of superfines caught by the filter f', causing a 2nd cohesion.

FIG. 2(b) is a construction in which the material in bulk on a water-cooled hearth H located in a corner of the chamber 1' is irradiated by an arc from a plasma gun PG with the resultant superfines in smog being caused to adhere to the inner wall of a collection cylinder P" cooled by means of a cooling coil CC.

The collecting method belongs to the former group.

The said apparatus has a higher rate of adhesion of superfines to the collection cylinder P" with the drawback of likelihood of causing the 2nd cohesion due to thick accumulation of superfines on the wall of the cylinder, thus rendering the apparatus unsuitable for continuous operation.

FIG. 2(c) is an apparatus in which arc is generated between the cathode CE and material in bulk on the water-cooled anode AE located in a corner of the reaction chamber 1' with the resultant superfines in smog being caused to adhere to the wall of a rotary drum D with the upper end closed and located nearly in the center of the chamber 1'.

As the rotary drum rotates, a wiper W in locaion scrapes off the superfines adhered to the wall, to let them deposit at the bottom of the chamber 1' and causes to be contained in the air-tight container via a shutter S intermittently opened and closed.

The method of this collection belongs to the former group.

Though capable of continued operation, the said apparatus is unable to eliminate the adhesion of superfines to the inner wall of the chamber 1', deteriorating the air-tightness within the chamber 1' due to the structure of the rotating shaft of the rotary drum D.

In addition, the use of wiper causes wear of the said wiper W as well as rotary drum D with possible mixture of impurities to superfines.

FIG. 2(d) is a construction in which a water-cooled anode AE and cathode CE are disposed in the upper portion of the chamber 1' with the bulky raw material laid on the anode AE being heated and melted by arc generated between anode and cathode to produce smog containing superfines, which is conducted to the lower portion of the chamber 1' of which circumferential wall is cooled with cooling water symbolized by CW, then guided to the exhaust path provided with a plurality of cyclone CY, carried by the flow of the said smog, superfines being caught by the collector 3 having the cyclones CY and filter F'.

This method of the collection belongs to the latter group.

The said apparatus is capable of continued operation until bulky material is exhausted because of smog in the chamber 1' being conducted out of the chamber 1' at a given flow rate. As the movement of superfines in the gas is inherently affected by Brownian movement or thermal migration and little affected by inertia or gravity, it is difficult to cause superfines to be carried by the flow of gas securely to the cyclone CY or filter f' for collection, with additional shortcoming of greater amount of adhesion of superfines to the inner wall of the chamber 1' or the inner surface of the conduit. To be quantitative, in the production of ceramic superfines undertaken by the inventor and others, 30 to 40 percent of the resultant superfines have been caught by the cyclone CY and collector 3 whereas remaining 45 to 50 percent have been scraped off the inner wall of the chamber 1' and pipe wall of the conduit, then collected with the remainder presumably dispersed into the atmospheric air through the filter f' in collector 3.

In summing up, the conventional technique with regard to collection of the resultant superfines requires a scraping operation for superfines adhered to the wall surface of chamber 1' or others or causes the 2nd cohesion or involves a deterioration in purity due to the mixture of impurities or results in lower collection rate, both being particularly serious drawbaks.

Thus, the collection step in the production of superfines results in unsatisfactory conditions, incapable of a stable and continuous operation, leaving much room for improvement.

SUMMARY OF THE INVENTION

The object of invention is to provide an apparatus for producing superfine particles of high purity, permitting a high rate of collection, being capable of continuous stable operation in which superfines of inorganic substances such as metals or ceramics are produced in an air-tight chamber from materials in solid, liquid or gas and caused to disperse and float in a gas within a chamber for collection without adhering thereof to the chamber wall, no occurrence of the 2nd cohesion, no mixture of impurities and permitting ready collection together with smog and being into the recovery path for collection. The other features and advantages of the invention will be readily apparent by the following description with reference to the attached drawings.

DETAILED DESCRIPTION OF PREFERRED EMBODYMENT

Figure 1:
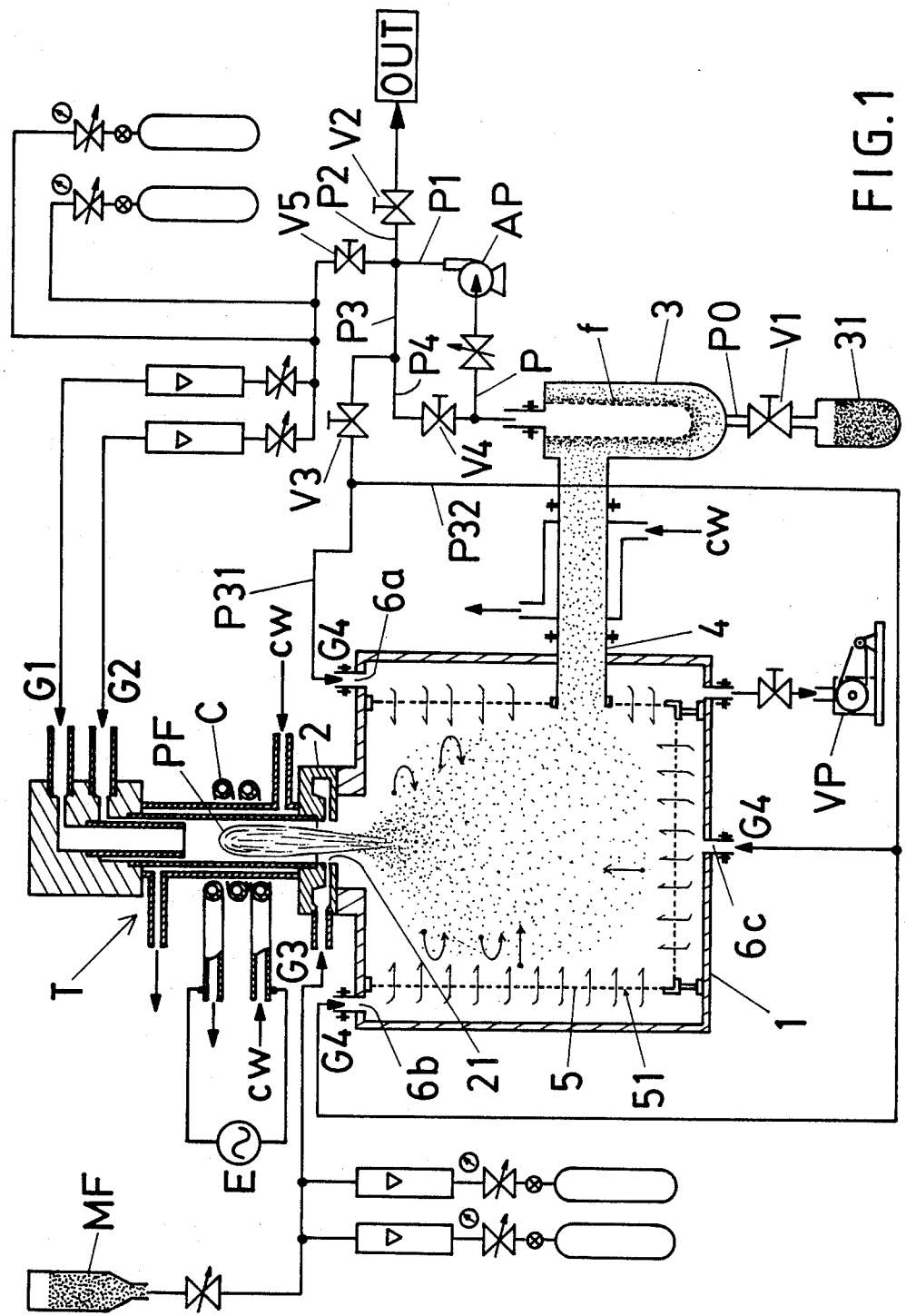
FIG. 1 is a partially sectional front view of an apparatus for continuous production of superfine particle by means of high-frequency plasma embodying the concept of the present invention.
Figure 2A:
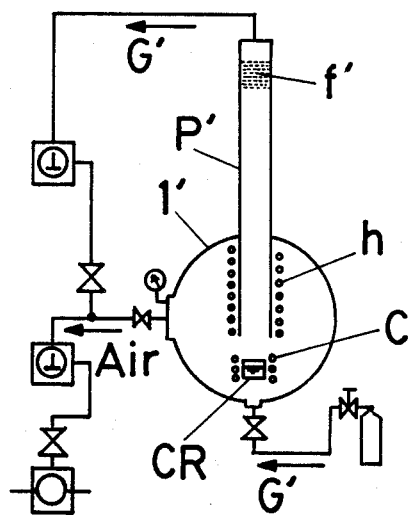
FIGS. 2(a)~(d) are partially sectional front views of the conventional apparatuses for superfine production.
Figure 2B:
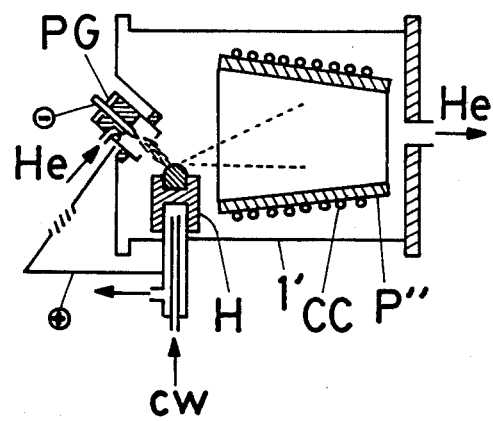
Figure 2C:
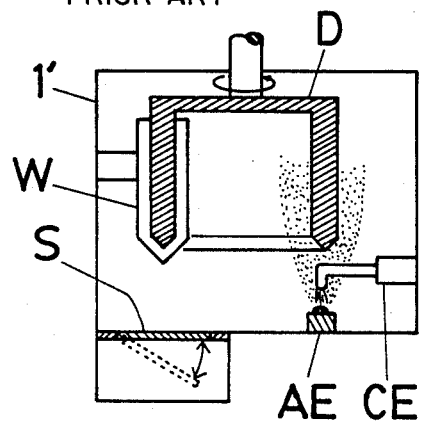
Figure 2D:
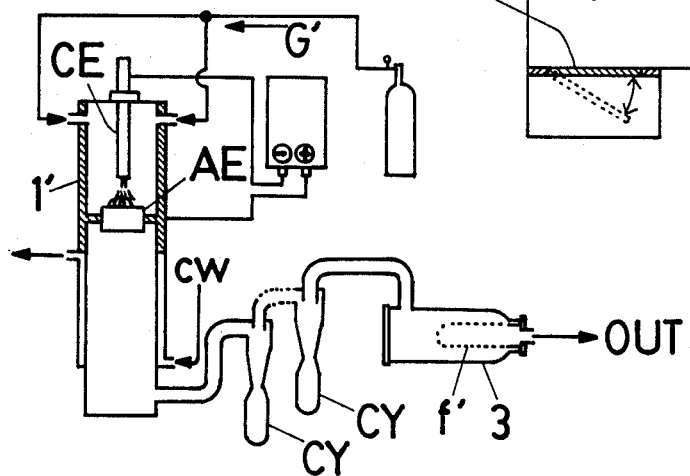

FIG. 1 is a schematic illustration of the apparatus embodying the present invention mounted on an apparatus embodying a concept of a prior invention (commonly assigned Japanese patent application No. 224986-86, filed: Sept. 25, 1986).

The prior method is characterized by the continuous production of superfines of high purity by means of high frequency plasma, more particularly feeding of the raw material powder to a plasma.

In the Figure, T represents a high-frequency plasma torch (hereinafter called Torch), E a high frequency power supply, C an induction coil connected with the said high-frequency power supply E, 1 a reaction chamber, 2 a raw material feeder provided between the opening of Torch and the chamber 1, 3 a collector, 4 a conduit connecting the chamber 1 and the collector 3. In the said Torch T, a core gas G1 consisting of given components supplied from the closed end direction is converted to high-temperature plasma PF by means of high-frequency energy provided from the induction coil C. G2 represents cooling gas flowed along the inner wall of the pipe for Torch T whereas CW represents cooling water for Torch T.

The feeder 2 is provided with the ports 21 obliquely for gas spouting through which for instance, raw material powder in the feeder MF is carried by carrier gas G3 consisting of given components into high-temperature plasma flame PF from the tangential direction.

The raw material melts and evaporates in the region at relatively low temperature in the flame PF, reacts with various gases G1~G3 for as long a time as possible to turn to the predetermined component molecule without giving a rise to a reverse reaction, then to superfines of high purity by aggregation and cohesion of a plurality of molecules in an atmospheric gas, transferred to the chamber 1 in a smog together with the atmospheric gas.

Whereas the foregoing is the summary of the prior invention, it is essential for the present invention to have a construction with regard to the chamber 1 filled with smog containing superfines and equipped with the piping system as described below.

In the proximity of the inner wall of the chamber 1, a vessel 5 is arranged which is made of the materials resistant to heat and not chemically reactive with superfines and having a number of pores 51 uniformly and all over the surface. For the vessel 5, a net woven with stainless steel wires or a stainless plate with pores 51 may be used as a member.

For instance, a 100 to 300 mesh net can be applicable as the mesh can be far larger than the resultant superfines.

The plate with the pore size as large as the mesh of net may be used preferably, however, with minimum spacing between neighboring pores. The vessel 5 in this embodiment of the invention is provided with no ceiling on the torch side. The opening end of the foregoing conduit 4 on the side of the chamber 1 has to be located at the inner side of the said vessel 5. VP represents a vacuum pump which is used for evacuating the air in the chamber 1 to be replaced by a given gas atmosphere prior to the starting of operation of the apparatus.

Whereas the foregoing collector 3 contains filter f, it has been found through testing testings that the use of bag filter permits a higher recovery rate of superfines. The exhaust side of the collector 3 is connected with an air pump AP through piping P whereas the base thereof is connected with a collecting bottle 31 by connecting pipe P0 provided with a valve V1. The duct P1 on the exhaust side of the foregoing air pump AP is branched off into the duct P2 which is connected with the exhaust OUT, the other into the duct P3 which is further branched into the duct P31, P32—of which extended ends are connected with a plurality of ports 6a, 6b, 6c provided on the wall of the chamber, but outside of the vessel 5.

The foregoing duct P2 has a valve V2 whereas the duct P3 is provided with a valve V3 so that a portion of the gas discharged by the air pump AP is exhausted through the exhaust OUT and a given amount of remaining flow can be conducted back as the recycle gas G4 to the chamber through the ports 6a, 6b, 6c—if the valves V2, V3 are opened to a predetermined level.

The duct P3 as well as P are short-circuited by the duct P4 provided with valve V4 whereas the duct P3 is arranged so as to be connected with the supply source of core gas G1 or cooling gas G2 via the valves V5 in which the foregoing valves V4 as well as V5 are normally closed.

This embodiment of the invention has the construction of the reaction chamber and piping system as described above so that the recycle gas G4 flowing in between the internal wall of the chamber and the outer wall of vessel 5 spouts through a number of pores 51 provided uniformly over the vessel in such way as shown by the arrows, which keeps the smog away from the wall of the chamber and even from the vessel 5, so that the superfines in the gas adhere neither to the inner wall surface of the chamber nor to the vessel 5 even in their Brownian movement or in thermal migration and are conducted securely into the conduit 4 together with the gas without the 2nd cohesion of the superfines being caused in the reaction chamber 1.

A portion of the gases G1~G3 supplied to the apparatus, are cable of recycling as recycle gas G4, thereby permitting a reduction in gas consumption.

Furthermore, as much as 10 to 25 percent of the total production quantity of the ultrafine particle escaped into the atmospheric air carried by the exhaust gas through the filter f in the conventional system, is partially conducted back to the chamber 1 carried by the recycle gas G4 to meet with the other superfines in the smog and cohere to a size capable of recovery.

In addition, while the valve V1 on the connecting tube P0 is opened and the valve V2 on the duct P2 is closed periodically and for every short period of time, the gas is caused to be flowed back by reverse operation of the air pump AP for a short period of time to separate the superfines caught in the filter f in the collector 3 and to drop them to the bottom thereof and then let them be contained in the collecting bottle 31 by opening the valve P0 for taking them out of the apparatus.

The superfines may also be collected in a similar manner as the air pump AP is stopped for a short period of time with the valve V2 closed and valves V4 and V5 opened, the reverse flow of the gas is caused in the collector 3.

The following is an example from among the various experiments conducted on the apparatus embodying the present invention:

EXAMPLE OF EXPERIMENT

The method of experiment: Aluminum nitride superfine particles are produced from raw material aluminum powder in the apparatus embodying the present invention and the resultant product is collected in a collecting bottle 31 have been measured after one hour operation.

Conditions of experiment:
*Power supply in service;

| Frequency | 4 MHz |
|---|---|
| Output | 35 KW |

*Vessel: used a plate SUS 316 (Japanese Industrial standard) on which a number of pores were provided and which was formed in a cylindrical basket to suit to a cylindrical chamber for mounting therein.

| Number of pores | | 1500/100 mm² |
|---|---|---|
| Diameter of pores | | 0.5 μm |
| *Raw material aluminum powder; | | |
| Purity | | 99.98% |
| Feed quantity | | 10 g/min |
| | | (600 g/hr) |
| *Component and flow rate of each gas used; | | |
| Core gas | G1; Ar | 18 l/min |
| | N₂ | 15 l/min |
| Cooling gas | G2; Ar | 20 l/min |
| | N₂ | 21 l/min |
| Carrier gas | G3; NH₃ | 20 l/min |
| Gas G4 spouted through pores | | 25 l/min |

| -continued |
|---|
| on vessel; mixed gas |

RESULTS OF EXPERIMENT

The products collected in the bottle 31 weighed 590 g, equal to approximately 66 percent of the recovery rate to the total resultant superfines of aluminum nitride for the material of 600 g/hr (The chemical reaction calculated amounts to approximately 900 g).

The diameter of aluminum nitride superfines collected in this experiment ranged 20 to 200 nm with the purity at 99.99 percent.

While there was almost no adhesion of aluminum nitride to the wall of vessel 5 in the chamber 1, adhesion of the resultant aluminum nitride to the ceiling of the chamber not provided with the vessel 5 was seen.

The sum of aluminum nitride superfines scraped off the said adhesion and off the adhesion to the inner surface of the conduit 4 weighed approximately 240 g.

It has been ascertained through the above experiment and other tests conducted with a variety of pore sizes and their density for the vessel and with various mesh sizes for the net, that the recovery rate with the collecting bottle 31 in the apparatus embodying the present invention ranged from 65 to 75 percent.

It has been demonstrated that this method had a recovery rate almost twice as much as the conventional ones with cyclones (s) CY combined with the collector 3.

In the above embodiment of the invention, there has been described an example of an atmospheric gas in the mixture of core gas G1, cooling gas for pipe wall G2 and carrier gas G3 being returned (gas symbolized by G4). It is also feasible to introduce the gas G4 directly from the supply source of the reaction-facilitating gas or inert gas without recycling the atmospheric gas, depending on reaction conditions of high-temperature plasma flame PF with the raw materials, resulting in, however, the advantage of the recovery of ultrafine particle being lost.

In the above embodiment of the invention, reference has been made to the example of experiment in which superfines were produced from a material powder by means of high-frequency plasma and then collected.

The present invention is also applicable to any apparatus wherein superfines of inorganic substances such as metals, ceramics or the like from the raw materials in solid, liquid or gas in an air-tight reaction chamber by the evaporation-in-gas method or to such processes as PVD or CVD using an arc plasma, laser or electron beam, are produced and caused to disperse and float in a gas in a chamber.

While in this embodiment of the present invention, no covering has been provided on the side of ceiling of the vessel 5, a covering may be provided thereto to the extent that the superfines-producing section such as plasma is not disturbed and the vessel is not thermally affected thereby.

The apparatus embodying the present invention for producing a variety of superfines is capable of producing continuously and stably, uniformly sized superfines of high purity and is capable of collecting the resultant superfines at a high rate, thus permitting an improved productivity of the apparatus and supply of less expensive superfines in large quantities to various fields of industries, bringing with it great advantages.

What is claimed is:

1. An apparatus for producing superfine particles of inorganic substances which comprises:
   a substantially airtight outer vessel,
   an enclosed inner vessel disposed within said outer vessel, the outer surface of said inner vessel being in proximity to the inner surface of said outer vessel,
   a means to form superfine particles from inorganic materials disposed within said inner vessel,
   a vacuum means outside said outer vessel connected by a conduit passing through said outer vessel to the inner surface of said inner vessel, and
   a collecting means connected to said vacuum means for collecting said superfine particles,
   said inner vessel having a plurality of pores extending from the outer surface to the inner surface thereof, to permit the flow of an atmospheric gas for collection of resulting superfine particles therethrough,
   said inner vessel further having an inlet for the introduction of inorganic materials capable of forming superfine particles,
   said outer vessel having at least one inlet for the introduction of said gas in said inner vessel flowing through said pores,
   whereby substantially all superfine particles formed in said inner vessel are removed by suction created by said vacuum means in a stream of gas entering said outer vessel and flowing through said pores of said inner vessel for collection by said collecting means.

2. The apparatus according to claim 1 wherein said inner vessel comprises walls made of wire mesh.

3. The apparatus according to claim 1 wherein said inner vessel includes walls consisting of sheets having a number of pores.

4. The apparatus according to claim 1 wherein said atmospheric gas introduced into the outer vessel consists of reaction-facilitating or inert constituent, or the mixture of both.

5. The apparatus according to claim 1 wherein a recycling means is provided for recycling the gas removed by said vacuum means to said gas inlet of said outer vessel.

* * * * *